United States Patent Office 3,149,811
Patented Sept. 22, 1964

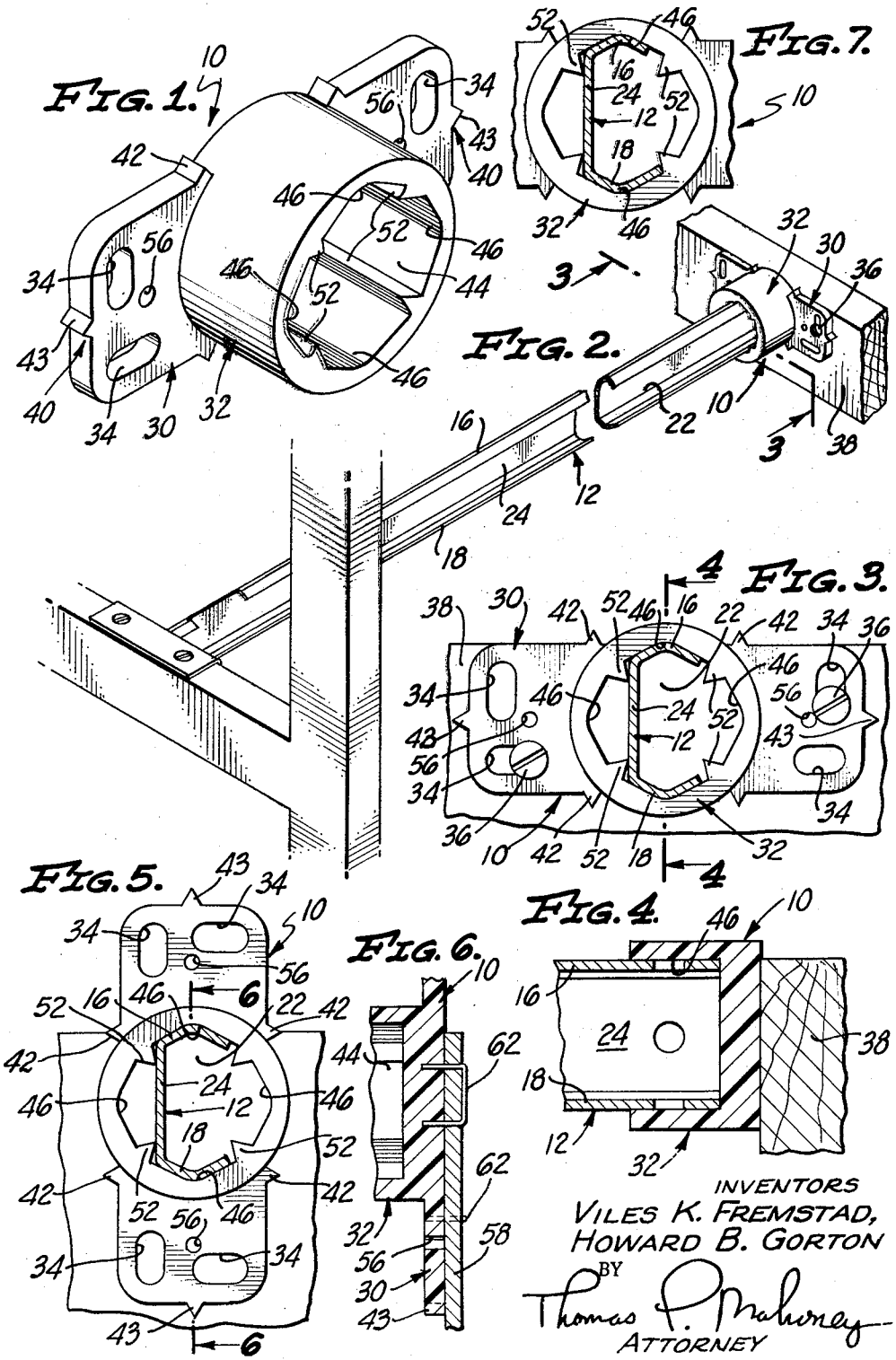

3,149,811
MOUNTING BRACKET FOR
ELONGATED TRACK
Viles K. Fremstad, Pomona, and Howard B. Gorton, West
Covina, Calif., assignors to Ajax Hardware Manufacturing Corporation, City of Industry, Calif., a corporation of California
Filed Sept. 17, 1962, Ser. No. 224,035
5 Claims. (Cl. 248—251)

This invention relates to a mounting bracket and, more particularly, to a mounting bracket adapted to be utilized in supporting a corresponding extremity of an elongated track member of the character customarily utilized as a guide for the roller in a drawer slide construction, or the like.

The bracket of the invention is adapted to be utilized with a track member whose upper and lower edges are angularly formed, said track member being generally of channel shape and having a side wall which is formed integrally with said upper and lower edges.

One of the principal problems encountered in mounting track members of the character referred to hereinabove is that it is extremely difficult to maintain the dimensional tolerances of said track members to an extent which will permit them to be tightly mounted in a corresponding, accurately dimensioned bracket.

It is, therefore, an object of my invention to provide a mounting bracket for a track member of the aforementioned character which includes a mounting plate having a socket member formed integrally therewith, said socket member having a plurality of oppositely disposed pairs of receptacles in the wall thereof which are angularly shaped to correspond to the angular configuration of the upper and lower edges of the track member. Formed in the wall of the socket intermediate the individual receptacles are stabilizing portions or protrusions adapted to engage the corresponding areas of the side wall of the track member in order that, if the upper and lower edges of the track member do not fit tightly in the corresponding receptacles, the stabilizing portions, by resiliently engaging the adjacent areas of the side wall will maintain the track member against rattling and free movement in the associated socket.

Another object of my invention is the provision of a bracket of the aforementioned character which is fabricated from a deformable plastic material such as high density polyethylene, or the like, and wherein the aforesaid stabilizing protrusions are deformable in order that they may be displaced by the corresponding side wall areas of the track member to permit the track member extremity to fit tightly in the associated socket of the mounting bracket.

Another object of my invention is the provision of a bracket of the aforementioned character in which the aforesaid protrusions are of triangular configuration, in plan, in order that the extremities thereof may be easily deflected to permit the socket to accommodate the adjoining extremity of a track member.

One of the problems encountered in installing conventional brackets adapted to support track members is the difficulty of orienting said brackets upon the supporting surface.

A further object of my invention is the provision of a track member of the aforementioned character incorporating a mounting plate which has oppositely disposed orienting means upon the perimeter thereof constituted by projections which can be utilized by the mechanic installing the bracket to properly orient the bracket with respect to the mounting surface.

An additional object of my invention is the provision of a bracket of the aforementioned character which can be utilized with the mounting plate oriented in either a vertical or a horizontal attitude so that the extremity of the track member may be received in one or the other pairs of receptacles.

Other objects and advantages of the invention will be apparent from the following specification, and the accompanying drawing, which is for the purpose of illustration only and in which:

FIG. 1 is an isometric view of a bracket constructed in accordance with the teachings of the invention;

FIG. 2 is an isometric view showing the manner in which the bracket can be utilized to support the rear extremity of a track member;

FIG. 3 is a transverse sectional view taken on the broken line 3—3 of FIG. 2;

FIG. 4 is a vertical, sectional view taken on the broken line 4—4 of FIG. 3;

FIG. 5 is a front elevational view showing the manner in which the bracket may be installed in operative relationship with a supporting surface by staples;

FIG. 6 is a fragmentary, sectional view taken on the broken line 6—6 of FIG. 5; and FIG. 7 is a view showing the location of a deformed track member in the bracket of the invention.

Referring to the drawing and particularly to FIGS. 1–3 thereof, I show a mounting bracket 10 for the rear extremity of an elongated track member 12, said mounting bracket being fabricated from such plastics as high density polyethylene. While I have specified a particular type of plastic, it is, of course, not intended that the teachings of the invention be limited to any specific plastic so long as the operative aspects of the bracket 10 can be achieved by the utilization of a specific plastic material.

The track member 12 is elongated and formed from sheet metal and incorporates upper and lower edge flanges 16 and 18, respectively, which are of angular configuration, as best shown in FIGS. 2 and 3 of the drawing. The upper and lower flanges 16 and 18 define an elongated opening 22 in the side of the track member 12 and are formed integrally with a side wall 24. The forward extremity of the track member 12 may be supported upon a bracket of the character disclosed in my co-pending application entitled "Drawer Slide," Serial No. 82,758, filed, January 16, 1961.

The mounting bracket 12 includes a mounting or base plate 30 of substantially rectangular configuration, said base plate having a socket member 32 formed integrally therewith. Incorporated in the base plate 30 are elongated mounting slots or openings 34 which are adapted, as best shown in FIG. 3 of the drawing, to receive mounting screws 36 inserted therethrough. The elongated nature of the mounting openings or slots 34 permits the adjustment of the base or mounting plate 30 with respect to the support 38 upon which the bracket 10 is mounted.

Formed integrally with the perimeter of the base plate 30 are orientation means 40 constituted by triangularly shaped projections 42 and 43. Orientating projections 43 are provided at the opposite extremities of the mounting plate 30 to facilitate the location of the bracket in a vertical attitude on a center line corresponding to the center line of the horizontal draw opening with which the track 12 is utilized, as best shown in FIG. 5 of the drawing. The orientating projections 42 are provided in pairs on opposite sides of the base plate 30 adjacent the socket member 32 to faciltate the orientation of the base plate 30 in a vertical attitude, as best shown in FIG. 5 of the drawing.

When installing the bracket in the horizontal attitude illustrated in FIG. 3 of the drawing, the edge of the base plate 30 is utilized in conjunction with the edge of the support 38 upon which the bracket is mounted to accurately orient the bracket 10 in the position shown in FIG. 3 of the drawing.

The socket member 32 defines a socket 44 which is characterized by the incorporation of oppositely oriented pairs of receptacles 46 having angularly configured walls which conform to the configuration of the angularly shaped upper and lower edges 16 and 18 of the track member 12, as best shown in FIG. 3 of the drawing.

Interposed between and constituting the extremities of the receptacles 46 are stabilizing protrusions 52 which are of triangular configuration, in plan, and which are adapted, as best shown in FIGS. 3 and 5 of the drawing, to engage corresponding surfaces of the side wall 24 and adjacent extremities of the upper and lower edges 16 and 18. Therefore, if the extremity of the elongated track member 12 disposed in the receptacles 46 has upper and lower flanges 16 which do not conform accurately to the configuration of the corresponding walls of the receptacles 46, the stabilizing protrusions 52 will engage the appropriate areas of the side wall 24 to urge the opposite extremities of the upper and lower edges 16 and 18 of the track member against the corresponding stabilizing protrusions 52.

Since the bracket 10 is fabricated from high density polyethylene plastic, deformation of the stabilizing protrusions 52 can occur and the pointed extremities of said protrusions can be deflected by inequalities in the configuration of the juxtaposed extremity of the elongated track member 12 to permit the stabilizing protrusions 52 to accommodate said deformation.

It will be noted that the pair of receptacles 46 through which the section line 4—4 is drawn in FIG. 3 of the drawing is adapted to receive the associated extremity of the elongated track member 12 in a horizontal orientation. However, when the bracket 10 is disposed in a vertical orientation, as illustrated in FIG. 5 of the drawing, the pair of receptacles 46 through which the section line 6 is drawn will receive the opposite edges 16 and 18 of the bracket 10.

As previously indicated, the base plate 30 incorporates elongated mounting holes or slots 34. However, in addition to said elongated mounting holes or slots 34, the plate 30 also incorporates nail receiving holes or apertures 56 which permit the bracket 10 to be mounted on a support 38 by use of nails instead of screws 36. In addition, the bracket 10 can be secured to a support 58 by means of staples 62, as best shown in FIGS. 5 and 6 of the drawing. The utilization of staples 62 is particularly advantageous when a major portion of the bracket 10 must be disposed above the adjacent support 58. In this case, the staple 62 can be driven into any portion of the bracket 10 which is disposed in overlying relationship with the support 58. Therefore, when an extremity of the track is inserted in the socket 44, the opposite edges 16 and 18 of the track are engaged in corresponding receptacles 46 of a pair of receptacles. The pair of receptacles utilized depends on whether the bracket 10 is disposed in the horizontal orientation of FIG. 3 or the vertical orientation of FIG. 5.

Of course, the configuration and size of the track 12 are maintained as accurately as possible but, should departures from the norm occur which result in the inadequate registration of the opposite edges 16 and 18 of the track member 12 with the walls of the receptacles 46, the stabilizing protrusions 52 will engage the corresponding areas of the vertical side wall 24 of said track member.

The manner in which an inaccurately formed track member is received in the bracket 10 and, more particularly, the receptacles 46 thereof, is illustrated in FIG. 7 of the drawing. In this case, the track 12 has a short edge 16 but the accurate orientation of the track 12 is maintained by the impingement of the stabilizing protrusions 52 on the side wall 24 of the track 12 and by engagement of the lower edge 18 between the protrusions 52 adjacent said lower edge.

On the other hand, should the corresponding extremity of the track member 12 be somewhat oversize, the stabilizing protrusions 52 will be deflected to permit the aforesaid extremity of said track member to be received in the corresponding receptacles 46.

Therefore, the socket 44 will always receive the corresponding extremity of the track member 12 in a snug fit to prevent rattling or looseness of the track member 12 in the socket 44. In addition, bending or shaping of the track member 12 to cause it to fit the socket 44 is obviated since, within limits, the various elements of the socket member 32 will permit accommodation to be made for inequalities in the size and shape of the corresponding extremity of the track member 12.

Moreover, the provision of the triangular oriented protrusions 42 at the opposite extremities of the mounting plate 30 and adjacent the base of the socket member 32 intermediate said extremities greatly facilitates the installation of the bracket 10 in operative relationship with a supporting surface in either a horizontal or vertical attitude.

We claim:

1. A mounting bracket for supporting an extremity of an elongated track which is formed with upper and lower, similarly shaped flanges connected in operative relationship with each other by a side wall, including: a base plate having a plurality of fastener receiving openings therein for mounting said bracket on a supporting surface; and a socket member on said base plate defining a socket having oppositely oriented pairs of receptacles whose walls are configured to the shape of said flanges, said socket having stabilizing portions interposed between said receptacles and adapted to engage contiguous areas of said side wall.

2. A mounting bracket for supporting an extremity of an elongated track which is formed with upper and lower, identically shaped flanges connected in operative relationship with each other by a side wall, including: a base plate having a plurality of fastener receiving openings therein for mounting said bracket on a supporting surface; and a socket member on said base plate defining a socket having oppositely oriented pairs of receptacles whose walls are configured to the shape of said flanges, said socket having stabilizing protrusions interposed between said receptacles and adapted to engage contiguous areas of said side wall, said base plate having oppositely oriented protrusions upon the opposite extremities thereof adapted to facilitate the axial alignment of said base plate with a mounting surface during the securement of said base plate thereto.

3. A mounting bracket adapted to support an extremity of an elongated track member having upper and lower angularly formed track portions and a vertical side wall formed integrally with said track portion including, a mounting plate incorporating a plurality of fastener receiving openings and having locating means on its perimeter adapted to facilitate the accurate orientation of said mounting plate upon a supporting surface and a cylindrical socket member formed integrally with said mounting plate, said cylindrical socket incorporating a plurality of oppositely oriented pairs of receptacles having angularly formed walls conforming to the angular configuration of said track portions of said track member and having radially oriented stabilizing protrusions located between said receptacles for engagement with corresponding portions of the side wall of said track member.

4. A mounting bracket adapted to support an extremity of an elongated track member having upper and lower angularly formed track portions and a vertical side wall formed integrally with said track portion including, a mounting plate incorporating a plurality of fastener receiving openings and having locating means on its perimeter adapted to facilitate the accurate orientation of said mounting plate upon a supporting surface and a cylindrical socket member formed integrally with said mounting plate, said cylindrical socket incorporating a plurality of oppositely oriented pairs of receptacles having angularly formed walls conforming to the angular configuration of said track portions of said track member and having radially oriented stabilizing protrusions located between said receptacles for engagement with corresponding portions of the side wall of said track member, said stabilizing protrusions being of triangular configuration in plan and having their extremities engageable with said side wall.

5. In a unitary bracket formed from deformable plastic material and adapted to support an extremity of a track member which is characterized by the incorporation of upper and lower track portions of angular configuration connected by an integral side wall, including, a mounting plate having a plurality of mounting openings therein for the reception of fasteners adapted to facilitate the mounting of said bracket upon a supporting surface, said mounting plate having orientation means thereupon adapted to facilitate the orientation of said plate with respect to said mounting surface, said orientation means being constituted by triangular protrusions formed on the perimeter of the opposite extremities of said plate, a socket member on said plate having a plurality of pairs of receptacles formed in the interior wall thereof, said receptacles being of angular configuration corresponding to the angular configuration of said track members and adapted to receive the same, and a plurality of stabilizing protrusions formed integrally with said wall of said socket member at the extremities of said receptacles, said stabilizing protrusions being constituted by radially oriented, triangularly formed projections whose extremities are adapted to engage the corresponding areas of the side wall of said track member to prevent movement of said track member in said socket member because of a failure of said track portions to correspond accurately with the corresponding walls of said receptacles.

References Cited in the file of this patent

UNITED STATES PATENTS

| | | |
|---|---|---|
| 905,142 | Bond | Dec. 1, 1908 |
| 1,852,262 | Pleiss | Apr. 5, 1932 |
| 1,866,331 | Toelle | July 5, 1932 |